US006813403B2

(12) United States Patent
Tennyson

(10) Patent No.: US 6,813,403 B2
(45) Date of Patent: Nov. 2, 2004

(54) MONITORING OF LARGE STRUCTURES USING BRILLOUIN SPECTRUM ANALYSIS

(75) Inventor: Roderick C. Tennyson, Toronto (CA)

(73) Assignee: Fiber Optic Systems Technology, Inc., West Chester, PA (US)

(*) Notice: Subject to any disclaimer, the term of this patent is extended or adjusted under 35 U.S.C. 154(b) by 104 days.

(21) Appl. No.: 10/147,074

(22) Filed: May 17, 2002

(65) Prior Publication Data
US 2003/0174924 A1 Sep. 18, 2003

Related U.S. Application Data

(60) Provisional application No. 60/363,848, filed on Mar. 14, 2002.

(51) Int. Cl.[7] ................................................. G02B 6/00
(52) U.S. Cl. ........................... 385/12; 385/13; 385/15; 356/32; 250/227.11; 250/227.14; 250/227.16
(58) Field of Search ........................... 385/12, 13, 15; 356/32; 250/227.11, 227.14, 227.16

(56) References Cited

U.S. PATENT DOCUMENTS

| | | | |
|---|---|---|---|
| 5,170,457 A | | 12/1992 | Jen .............................. 385/123 |
| 5,182,779 A | * | 1/1993 | D'Agostino et al. .......... 385/13 |
| 5,218,197 A | | 6/1993 | Carroll ................... 250/227.19 |
| 5,406,370 A | | 4/1995 | Huang et al. ................ 356/350 |
| 5,821,426 A | * | 10/1998 | Uchiyama ..................... 73/800 |
| 5,991,479 A | * | 11/1999 | Kleinerman ................. 385/31 |
| 6,237,421 B1 | * | 5/2001 | Li et al. ......................... 73/800 |
| 6,366,348 B1 | * | 4/2002 | Sato et al. .................. 356/73.1 |
| 6,380,534 B1 | * | 4/2002 | Farhadiroushan et al. ....................... 250/227.14 |
| 6,541,758 B2 | * | 4/2003 | Yashiro et al. .......... 250/227.14 |
| 6,555,807 B2 | * | 4/2003 | Clayton et al. ........ 205/227.16 |
| 6,698,919 B2 | * | 3/2004 | Chi et al. ...................... 374/45 |
| 6,703,635 B2 | * | 3/2004 | Yashiro et al. .............. 250/577 |
| 2003/0094281 A1 | * | 5/2003 | Tubel ..................... 166/250.03 |

FOREIGN PATENT DOCUMENTS

| | | |
|---|---|---|
| GB | 2190186 A | 11/1987 |
| GB | 2289331 A | 11/1995 |
| JP | 64-33218 | 2/1989 |
| JP | 64-50718 | 2/1989 |
| JP | 1-134851 | 5/1989 |
| JP | 3-183925 | 8/1991 |
| JP | 3-185324 | 8/1991 |

(List continued on next page.)

OTHER PUBLICATIONS

A. Brown et al, "Spatial Resolution Enhancement of a Brillouin–Distributed Sensor Using a Novel Signal Processing Method," *IEEE Journal of Lightwave Technology*, vol. 17, No. 7, Jul., 1999, pp. 1179–1183.

Parameter calculation of distributed optical fiber strain sensor based on Brillouin scattering, Acta Aeronautica et Astronautica Sinica, Issn. 1000–6893 vol. 20, No. 2, Mar. 1999, p. 137–140, Huang, Minshuang; Zeng, Li; Tao, Baoqi.

Simultaneous strain and temperature measurement using a Brillouin scattering based distributor sensor; Smith, Jeff; Brown, Anthony; DeMerchant, Michael; Bao, Xiaoyi; Society of Photo–Optical Instrumentation Engineers (SPIE), vol. 3670, 1999, p. 366–373.

(List continued on next page.)

*Primary Examiner*—Akm Enayet Ullah
*Assistant Examiner*—Daniel Petkovsek
(74) *Attorney, Agent, or Firm*—Blank Rome LLP

(57) ABSTRACT

Brillouin scattering spectrum analysis is used to measure strain, displacement, temperature or other physical quantities at any location along an optical fiber attached to a structure. The fiber can be interrogated with different pulse widths for coarse and fine scans. The fiber can also have multiple sensors, either formed in a single fiber or branching off from a backbone fiber, in which case other segments of the fiber can be used for temperature compensation.

23 Claims, 7 Drawing Sheets

FOREIGN PATENT DOCUMENTS

| | | | |
|---|---|---|---|
| JP | 5-172657 | 7/1993 | |
| JP | 6-230391 | 8/1994 | |
| JP | 7-280695 | 10/1995 | |
| JP | 8-54257 | 2/1996 | |
| JP | 8-244901 | 9/1996 | |
| JP | 8-326036 | 12/1996 | |
| JP | 9-53998 | 2/1997 | |
| JP | 9-329469 | 12/1997 | |
| JP | 10-90016 | 4/1998 | G01D/21/00 |
| JP | 10-106616 | 4/1998 | |
| JP | 10-153475 | 6/1998 | G01F/23/46 |
| JP | 10-153610 | 6/1998 | G01D/5/10 |
| JP | 11-6715 | 1/1999 | G01B/11/16 |
| JP | 11-62420 | 3/1999 | |
| JP | 11-173943 | 7/1999 | |
| JP | 11-304549 | 11/1999 | G01D/21/00 |
| JP | 2000-46528 | 2/2000 | |
| JP | 2000-55629 | 2/2000 | |
| JP | 2000-258135 | 9/2000 | G01B/11/16 |
| WO | WO 00/00799 | 1/2000 | |

OTHER PUBLICATIONS

Analysis of the precision of a Brillouin scattering based distributed strain sensor;Brown, Anthony W.; DeMerchant, Michael D.; Bao, Xiaoyi; Bremner, Theodore W. ;SPIE Proceedings. Vol 3670, 1999, p. 359–365.

Advances in distributed sensing using Brillouin scattering; Brown, Anthony W.; DeMerchant, Michael D.; Bao, Xiaoyi; Bremner, Theodore W. ;SPIE Proceedings. vol. 3330, 1998, p. 294–300.

Schlumberger Announces Agreement to Acquire Sensa; Addition of Industry Leader in Fiber Optic Sensing Technologies Complements Production Optimization Services; Business Wire Sep. 6, 2001

GN Nettest Acquires PK Technology and York Sensors; Move Gives GN Nettest Larger Market Share in Fiber Optic Industry; PR Newswire Jun. 30, 1999, Anonymous; Newsbytes New Network, Jan. 14, 1997.

Field test of distributed temperature and strain measurement for smart structures; Facchini, Massimo; Fellay, Alexandre; Nikles. Marc; Robert, Philippe; Thevenaz, Luc; Pacific Rim Conference on Lasers and Electro–Optics, CLEO–Technical Digest, CA Conference Paper, pp. 1490–1491.

Strain measurement in concrete structure using distributed fiber optic sensing based on Brillouin scattering with single mode fibers embedded in glass fiber reinforcing vinyl ester rod and bonded to steel reinforcing bars; Bao, X; Bremner, T.W.; Brown, A.W.; Chhoa, C.Y.; DeMerchangt, M.D.; Georgiades, A.V.; Kalamkarov, A.L.; SPIE vol. 4337 2001 p. 466–473.

Strain measurement of the steel beam with the distributed Brillouin scattering sensor; Bao, X; Bremmer, T; Brown, A; DeMerchant, M.; SPIE vol. 4337 2001 p. 223–233.

Simultaneous temperature and strain monitoring of composite cure using a Brillouin scattering–based distributed fiber optic sensor; Arcand, A; Bao, X; Huang, C.; Lee–Sullivan, P.; Zeng, X; SPIE vol. 238 2001 p. 70–78.

Brillouin scattering based distributed sensors for structural applications; Brown, A.W.; Smith, J.P.; Bao, X; Demerchant, M.D.; Bemner, T.; Journal of Intelligent Material Systems and Structures 10, (4) 1999; Apr. 1999, pp. 340–349.

Enlargement of measurement range of optical–fiber Brillouin distributed strain sensor using correlation–based continuous–wave technique; Hotate, K.; Tanaka, M; Technical Digest (IEEE Cat. No. 01CH37170) 2001, pp. 119–120.

High–resolution distributed fiber Brillouin strain sensing; Hotate, K; Tanaka, M.; Conference Proceedings; Hotate, K.; Tanaka, M.; Conference Proceedings, 2001 pp. 271–274.

Distributed fiber Brillouin strain sensing with 1–cm spatial resolution by correlation–based continuous–wave technique; Hotate, K; Tanaka, M.; IEEE Photonics Technology Letters, IEEE Photonics Technol. Lett. USA) vol. 14, Feb. 2002 pp. 179–181.

Simultaneous optical fibre distributed measurement of pressure and temperature using noise–initiated Brillouin scattering; Parker, T.R.; Farhadiroushan, M.; Diatzikis, E.; Mendez, A.; Kutlik, R.L.; SPIE vol. 4185, pp. 772–775.

Signal–to–noise enhancement of a distributed fibre–optic temperature sensor using optical preamplification; DeSouza, K.; Newson, T.P.;SPIE vol. 4185; p. 764–7.

Tensile and compressive strain measurement in the lab and field with the distributed Brillouin scattering sensor; Xiaoyi Bao; DeMerchant, M. Brown, A.; Bremner, T.; Journal of Lightwave Technology, vol. 19, Nov. 2001 pp. 1698–1704.

A high nonlinearity elliptical fiber for applications in Raman and Brillouin sensors; Hattori, H.; Schneider, V.M.; Lisboa, O.; Cazo, R.M.; Optics and Laser Technology, Jul. 2001, pp. 293–298.

Fiber Optic Temperature Sensor System (Conax Buffalo Technologies LLC), No author; Copyright 2001 Penn Well Publishing Co.

Meaure hot spots with light; Journal–Electrical World, No. 4, Jul. 1, 2000 pp 64.

Implementation of Brillouin Active fiber sensors in smart structures; Yu,c.; Tan, W.; Washington, T.; May 1997 1 pp–Corporate author–North Carolina Agricultural and Technical State Univ. Greensboro. College of Engineering.

Application of optical fiber sensor in civil structural monitoring; Daniele Inaudi, Smartec SA, Proc. SPIE vol. 4328 (2001), pp. 1–10.

* cited by examiner

EFFECT OF LASER PULSE TIME (WIDTH) ON FIBER OPTIC
SENSOR GAGE LENGTH (METERS) FOR BRILLOUIN SCATTERING
SINGLE MODE OPTICAL FIBER

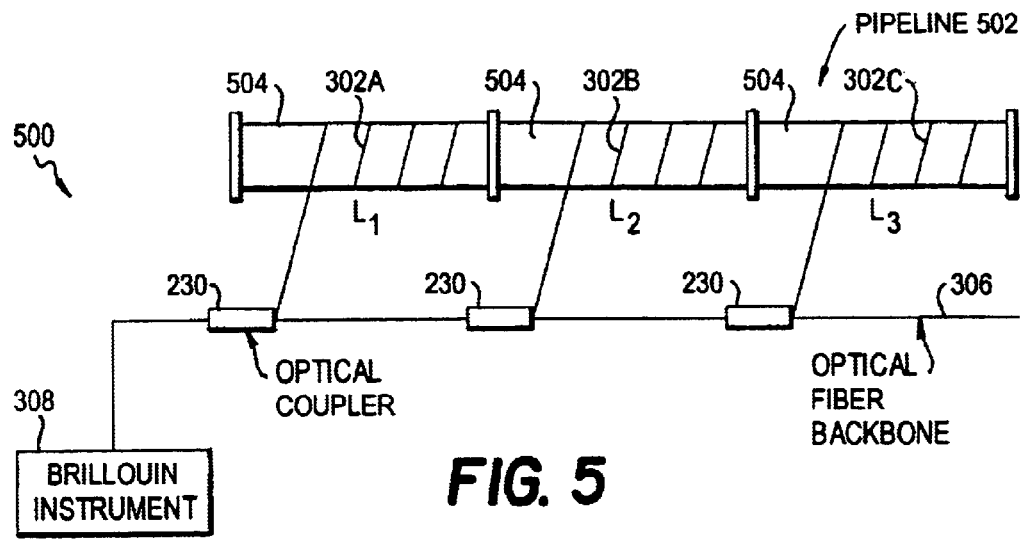
FIG. 5
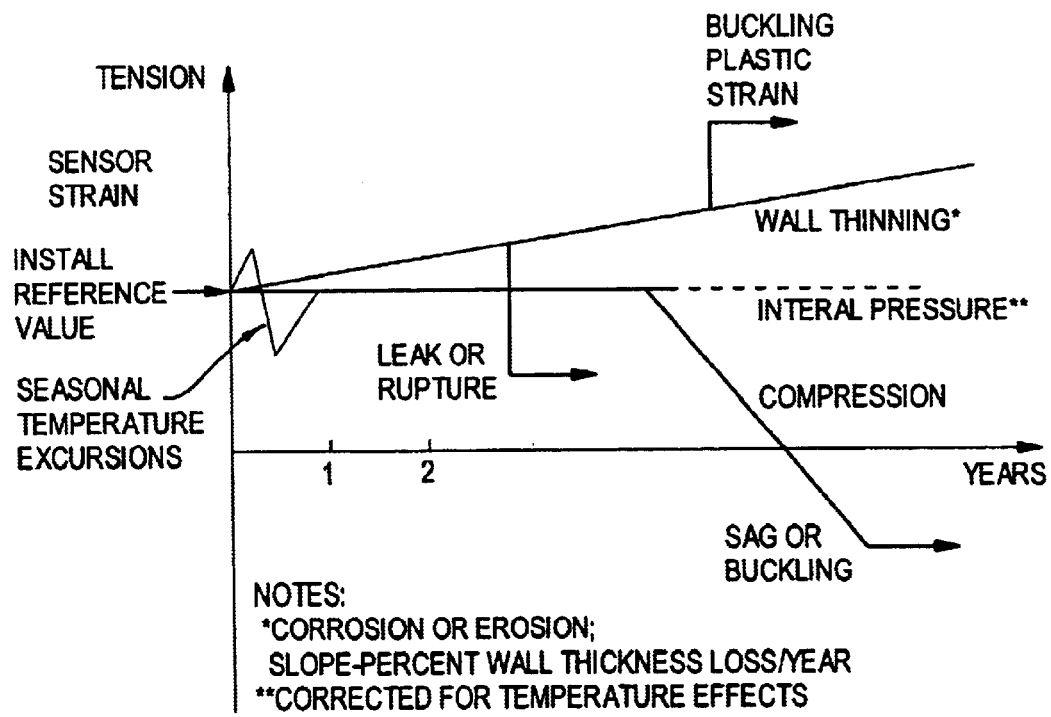
FIG. 6 APPLICATION OF BRILLOUIN FIBER OPTIC SENSOR TO PIPELINE NTERPRETATION OF SENSOR STRAINS

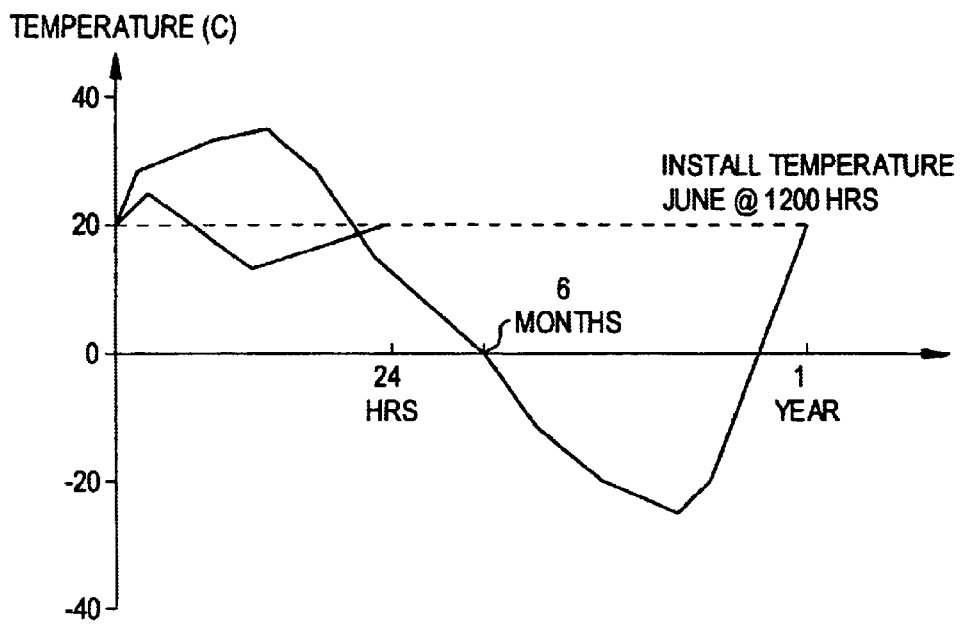
FIG. 7 EXAMPLE OF DIURNAL AND SEASONAL TEMPERATURE PROFILES RECORDED BY BRILLOUIN SENSOR MOUNTED ON STRUCTURE
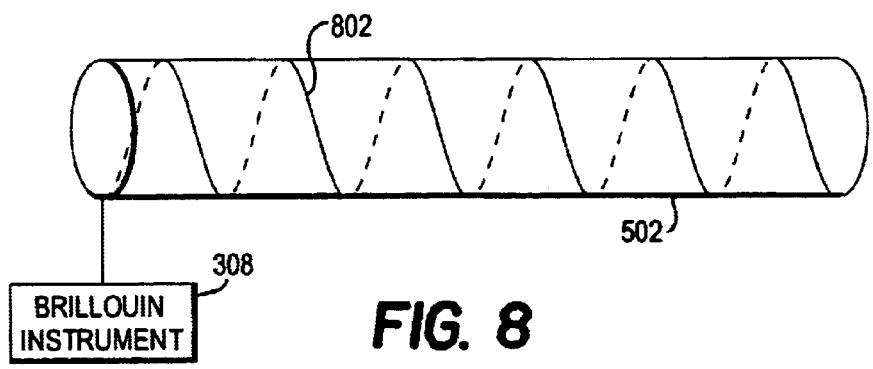
FIG. 8

APPLICATION OF BRILLOUIN STRAIN SENSOR TO
MEASURE STRUCTURAL/FOUNDATION DISPLACEMENTS

MONITORING OF LARGE STRUCTURES USING BRILLOUIN SPECTRUM ANALYSIS

REFERENCE TO RELATED APPLICATIONS

The present application claims the benefit of U.S. Provisional Application No. 60/363,848, filed Mar. 14, 2002. Related subject matter is disclosed in U.S. patent application Ser. Nos. 09/987,436 and 09/987,437, both filed Nov. 14, 2001. The disclosures of all of the just cited applications are hereby incorporated by reference in its entirety into the present disclosure.

FIELD OF INVENTION

The present invention is directed to a method of measuring physical characteristics, particularly but not exclusively strain, displacement and temperature, and in particular to such a method based on the measurement and analysis of the Brillouin scattering spectrum. The present invention is further directed to a fiber optic sensing configuration for use in measuring such physical characteristics.

DESCRIPTION OF RELATED ART

When laser light pulses are propagated down an optical fiber, light is backscattered due to changes in density and composition, as well as molecular and bulk vibrations within the fiber material. That backscattered light includes Rayleigh, Brillouin and Raman backscattered components. The Raman backscattered light, caused by thermally induced molecular vibrations, can be used to obtain information on temperature distributions along the fiber. Thus, that technique has been demonstrated for using optical fibers as sensors for leakage detection in pipelines and underground storage vessels, for example.

Brillouin scattering results from scattering of light by sound waves, which produce a periodic modulation in the fiber's index of refraction. That phenomenon is measured by the Brillouin frequency shift, given by the formula, $$F=2nV/L \qquad (1)$$

where F=the Brillouin frequency, n=index of refraction of the fiber, V=velocity of the light wave in the fiber and L=wavelength of the incident light in the fiber. Thus the application of mechanical strain and/or temperature to the fiber results in changes in "F". The use of Brillouin loss spectrum analysis to measure strain and temperature with single mode optical fibers is superior to using the Brillouin "gain" technique, since it has been shown that the "loss" method can be applied over longer fiber distances.

To obtain both temperature and strain, measurements of the Brillouin power as well as the Brillouin frequency shift (F) are required. The measured Brillouin strain in an optical fiber contains components associated with the fiber's temperature (reflecting both ambient temperature and that of the structure to which it is attached) and the mechanical strain applied to the structure (to which the fiber is attached), given by the following equation, $$E(x)=E_t(x)+E_m(x) \qquad (2)$$

where E(x) is the measured Brillouin total strain as obtained from measuring the Brillouin frequency shift (F) at any location "x" along the fiber, $E_t$ is the thermal strain component and $E_m$ is the mechanical applied strain. Thus the determination of $E_t$ allows one to calculate the mechanical strain knowing E(x).

It is known in the art to use the Brillouin frequency shift to measure optical fiber distortion, temperature along a fiber or both temperature and distortion. The use of a single laser light source to also measure temperature and distortion is also known. Limited applications of the Brillouin method utilizing buried optical fibers are disclosed in the prior art, purporting to measure earth sloping, distortion of the ground between fixed points and the motion of embedded weights attached to an optical fiber. A method of measuring a single optical fiber's distortion between two fixed points using Brillouin scattering is also known.

Brillouin instruments have been developed to measure temperature distributions over long distances using single mode optical fiber, where the fiber runs, e.g., along the bottom of a lake. It has also been shown that a Brillouin instrument can measure the concrete curing temperature distributions in a dam. One commercial Brillouin instrument using a single DFB light source is known, but it is limited to a strain accuracy of ±100 to 300 microstrain, or 0.01% (1 microstrain=$10^{-6}$ mm/mm or in/in). Such strain accuracies are not suitable for applications to bridges and pipelines, for example, where maximum operating strains are of the order of 100 microstrain.

The typical Brillouin instrument system used to measure strains and temperatures, shown schematically in FIG. 1 as 100, can incorporate one or two light sources. To achieve better strain measuring accuracies, it is known to use two separate "frequency tunable" laser light sources 102, 104 operating at about 1320 nm wavelength. One laser 102 acts as a pump laser, while the other laser 104 serves as the probe laser which sends optical pulses down the fiber 106 to interact with the counter propagating laser lightwave pumped into the fiber 106 from its opposite end. Each laser 102, 104 is in optical communication with the fiber 106 through a polarization controller 108, 110. In addition, a pulse generator 112 controls a modulator 114 to modulate the light from the pump laser 102 to form pulses. A circulator 116 diverts light from the fiber 106 into a signal detector 118, whose output is applied to an oscilloscope 120. In addition, the output of a detector 122 is applied to a spectrum analyzer 124, whose output is applied to an oscilloscope 126. The outputs of both of the oscilloscopes 120, 126 are analyzed in a data acquisition system 128. The system 100 operates in a manner which will be familiar to those skilled in the art.

It is well known to those skilled in the Brillouin technology that both lasers can be located at one end of the fiber, providing the other end has a mirror (or some other reflective optical element) to reflect the laser wavelengths. A possible configuration to perform that task is shown in FIG. 2 as 200, in which the light from the lasers 102, 104 is applied to the same end of a Brillouin fiber sensor 206. In FIG. 2, reference numerals 230 and 232 designate couplers and sections of single-mode optical fiber, respectively, while those reference numerals which are common to FIGS. 1 and 2 have the same significance in both of those figures. In addition to the laser light sources, other instrumentation components include, but are not limited to, a pulse generator, a spectral analyzer and a signal detection system. The theoretical description of how that Brillouin loss technique works is known in the art.

It is known that a Brillouin system can be used to measure strain over optical fiber distances exceeding 50 km. It is also known that a Brillouin system can achieve a strain resolution of typically as low as ±20 microstrain, over gage lengths as small as 10~15 cm, and can measure temperature changes as low as ±1° C. Such measurements, based on the system shown in FIG. 1, obtain information on the Brillouin frequency shift and the Brillouin loss spectrum, which combine to yield simultaneous measurements of the strain and temperature over the selected gage length.

Applications of the Brillouin loss technique, as described in the published literature, are limited to laboratory materials and small test structural elements such as a steel beam and concrete beams. None of the published documents employ, or describe, in their experiments or test cases, how to apply the Brillouin loss technology to large structures such as pipelines, dams, buildings or bridges, for example. No data or design concepts on large structural applications have been reported in these documents or their related references contained in their publications. No mention is ever made of the potential use of multiple Brillouin sensors operating off a single fiber optic backbone.

SUMMARY OF THE INVENTION

It will be apparent from the above that a need exists in the art to overcome the above-noted deficiencies in the art. It is therefore a primary object of the invention to apply Brillouin loss technology to large structures.

It is another object of the invention to apply Brillouin loss technology to measure physical characteristics such as strain or displacement over large structures and also, optionally, to determine the location of the strain or displacement and to compensate for temperature.

To achieve the above and other objects, the present invention is directed to the application of a fiber optic sensing system based on the measurement and analysis of the Brillouin scattering spectrum to measure, e.g., strain (or displacement) and temperature distributions remotely, over long distances, with a controllable gage length, at any location along an optical array of fibers (including the special case of a single fiber) which have been attached to any large structure such as a pipeline, dam, building or bridge or any other structural configuration. In particular, the attachment of optical fibers (single mode fiber is the preferred fiber material) to the surface of a structure, or embedding the fibers in a structure (such as a concrete casting for example), and measuring the Brillouin scattering spectrum (the preferred method employs the "loss" spectrum) allows one to determine simultaneously the state of strain (or displacement) and temperature averaged over specific "gage lengths", at selected locations along the fiber array. A Brillouin Displacement Sensor (BDS) is one embodiment of that fiber optic sensor system.

The advantages of using Multiple Brillouin Sensor Arrays (MBSA) are: that system allows for sensing redundancy in that if one or more sensors fail, there are other sensors still active; multiple sensors permit the splitting off of the sensors to different parts of a large structure, thus making sensor routing relatively easy compared to using a single fiber sensor; the sensors can be attached to a structure in such as way as to discriminate between temperature and mechanical strain by leaving some sensors unbonded to the structure to obtain thermal response, while the attached or bonded sensors measure combined thermal and mechanical straining, as denoted by Eq.2.

Brillouin scattering spectrum analysis can be implemented using multiple Brillouin fiber optic sensors to measure strain, displacement and temperature on structures. The Brillouin sensors are routed off a common fiber optic backbone to various parts of the structure in which the backbone itself can be used as a Brillouin sensor. As a displacement measuring system, the array of Brillouin sensors can be attached at fixed points, and optically coupled to a fiber backbone to measure discrete displacements at a number of locations on a structure or foundation to yield information on such aspects as growth of cracks and fissures and ground settling effects on structures, for example. Application embodiments highlighted include, but are not limited to, pipelines, bridges and ground movements, as examples. Separation of temperature strains from mechanical strains is demonstrated using multiple sensors, and incorporating unbonded sensor gage lengths. The use of coarse and fine scan pulse widths is demonstrated to permit the interrogation over long distances (such as pipelines) to isolate regions of the structure (in shorter times using the coarse scan mode) where more detailed evaluation of the strain field is required using shorter gage length pulses.

In an illustrative embodiment, the multiple Brillouin sensors can be optically coupled to a common optical fiber backbone using a Brillouin instrument for generating the light waves and sensing signals, based on one of the instruments shown in FIGS. 1 and 2. One can design the modulated pulse width to achieve a desired sensor gage resolution for any of the Brillouin sensors of that embodiment. A particular application of the MBSA concept is for a pipeline consisting of multiple pipe sections, each of which has a Brillouin sensor (of any length) bonded or attached to the exterior surface of the pipe wall. Interrogating the multiple Brillouin sensors provides distributions of temperature and strain along the pipe sections. If one employs a single Brillouin fiber optic sensor, a methodology for measuring strain and temperature distributions along the pipeline is disclosed for a spiral wrap technique, which may be used for different sections of the pipeline.

Another concept of employing the MBSA system is disclosed in which displacement distributions are made using multiple fixed points to which the sections of the optical fiber are attached. Each Brillouin sensor mounted between two fixed points can constitute a portion of a continuous optical fiber (as shown) or can be configured as separate Brillouin optical fiber sensors, optically connected to a common fiber backbone. The use of optical fiber loops to allow for pre-tension of the sensing fiber (which may be employed in either the form of a continuous fiber, or as separate fiber sensors) permits the measurement of contraction (ie: shortening of the sensor by virtue of the fixed points moving closer together) or elongation (ie: extension of the fiber sensor by virtue of the fixed points moving away from each other). Applications of the Multiple Brillouin Displacement Sensor (MBDS) system can include, but are not limited to, measuring ground displacements associated with dams for example, movement of foundations, growth of ground cracks/fissures in seismic fault areas, and long term erosion. The displacement range and Brillouin sensor sensitivity to very small movements can be designed according to the Brillouin instrument used, which has shown a strain accuracy of ±20 microstrain. That corresponds to a displacement accuracy of about 0.4 mm. for a 20 meter long gage length. One can assess the range of structural displacements one can achieve for different Brillouin strain measurements and Brillouin sensor gage lengths employed.

Applications of single (and multiple) Brillouin strain sensors to bridges, are disclosed. It will be shown below how the sensor can be attached to a number of girders by routing them down the span of the bridge, and connecting at one fiber end. As in other cases described above, if two fiber ends are required, depending on the instrumentation used, then the return fiber can be routed back to the instrument. Helically wound Brillouin fibers can also be bonded or attached to concrete or steel bridge support columns, to measure hoop (circumferential) expansion due to material corrosion, as another embodiment.

BRIEF DESCRIPTION OF THE DRAWING

Various preferred embodiments will be set forth in detail with reference to the drawings, in which:

FIG. 5 shows a sensor system like that of FIG. 3 applied to a pipeline;

FIGS. 6 and 7 show graphs used in interpreting the data from the system of FIG. 3 or 5;

FIG. 8 shows a schematic diagram of a system in which a single optical fiber sensor is axially wrapped around a pipeline;

DETAILED DESCRIPTION OF PREFERRED EMBODIMENTS

Figure 1:
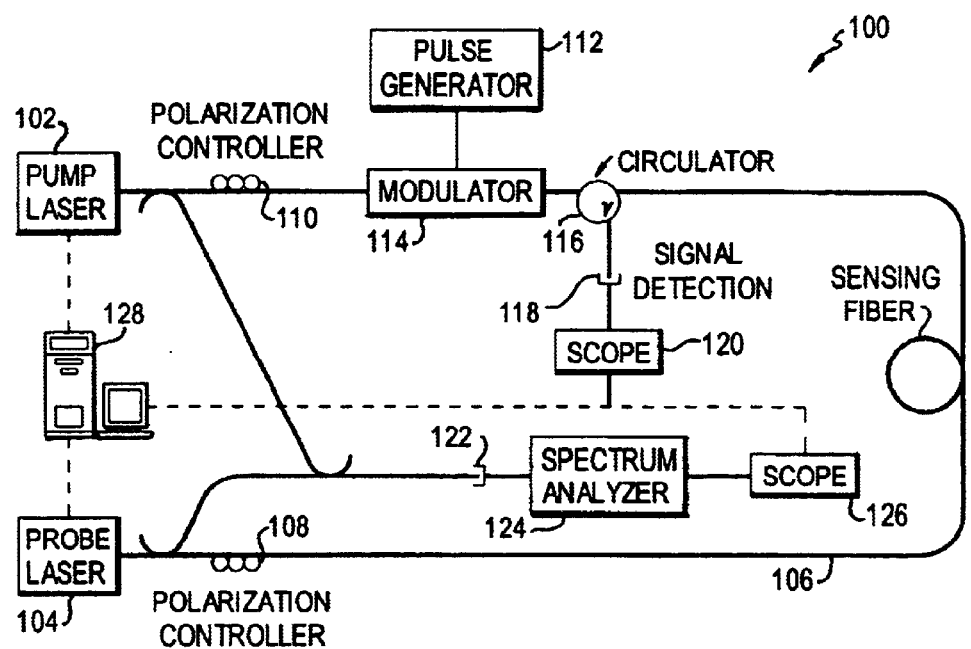
FIGS. 1 and 2 show schematic diagrams of two conventional Brillouin sensor systems.

Preferred embodiments of the present invention will be set forth in detail with reference to the drawings, in which like reference numerals refer to like elements throughout.

Figure 2:
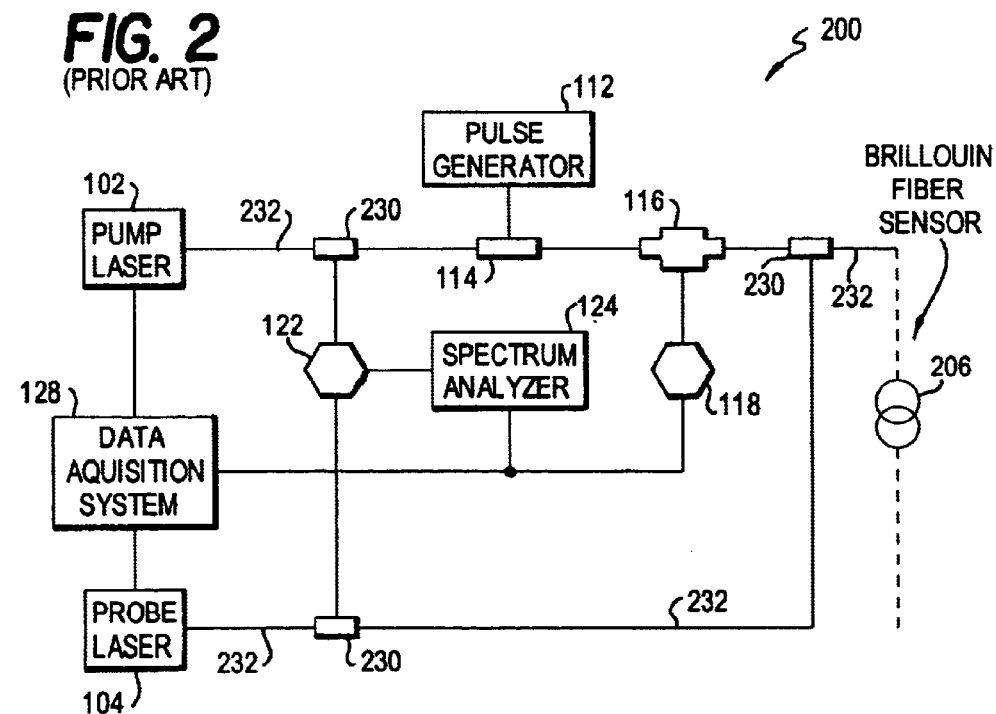
Figure 3:
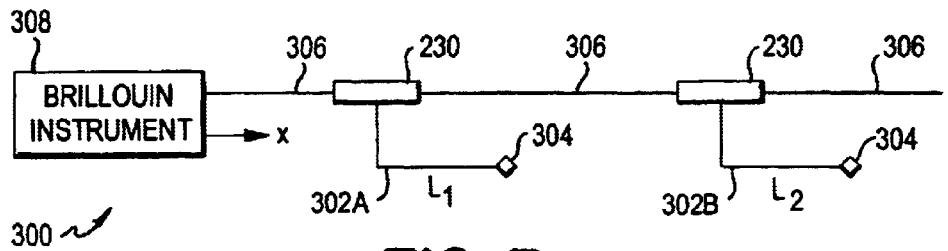
FIG. 3 shows a schematic diagram of a sensor system having multiple Brillouin sensors branching from a backbone optical fiber.

The schematic shown in FIG. 3 illustrates an embodiment of the sensor array system 300, in which multiple sensors 302A, 302B, . . . , having strained fiber lengths $L_1$ and $L_2$ and with mirrored ends 304 are optically coupled using standard optical couplers 230 to an optical fiber backbone 306 which is connected to a Brillouin instrument 308, which can be configured in any form, as suggested, e.g., in FIGS. 1 and 2. The arrow labelled X represents the direction of propagation of light from the Brillouin instrument 308. If the configuration depicted in FIG. 1 is employed, then the optical fiber must be returned to the instrument to accept the probe signal. Otherwise, the mirrored ends 304 on the optical fiber Brillouin sensors 302A, 302B, . . . , will produce the counter propagating probe signal, as described below.

The principle of operation of the Multiple Brillouin Sensor Array (MBSA) system is as follows:

(a) A probe signal is sent down the optical fiber backbone 306 and splits into two components, one continuing down the optical fiber backbone 306 towards the sensor 302B and the other component to the sensor 302A. The intensity of each component is related to the predetermined optical coupler 230 transmitting/splitting characteristics (such as 75%/25%, which means 75% of the light intensity is transmitted along the fiber 306, while 25% is directed to the sensor 302A). That ratio will be determined in a sensor array configuration by the sensitivity of the light detection system used in the Brillouin instrument 308 and the optical power of the laser light sources. The probe light continues at 75% intensity, using the above numbers for example only, and again splits at the second coupler 230, with 25% of the 75% (which equals about 19% of the original light intensity from the Brillouin probe laser light source) transmitted along the sensor 302B and back reflected off the mirrored end 304, and 75%×75%=56% of the original light intensity now passing along the fiber backbone 306 to a third sensor (not shown).

Figure 4:
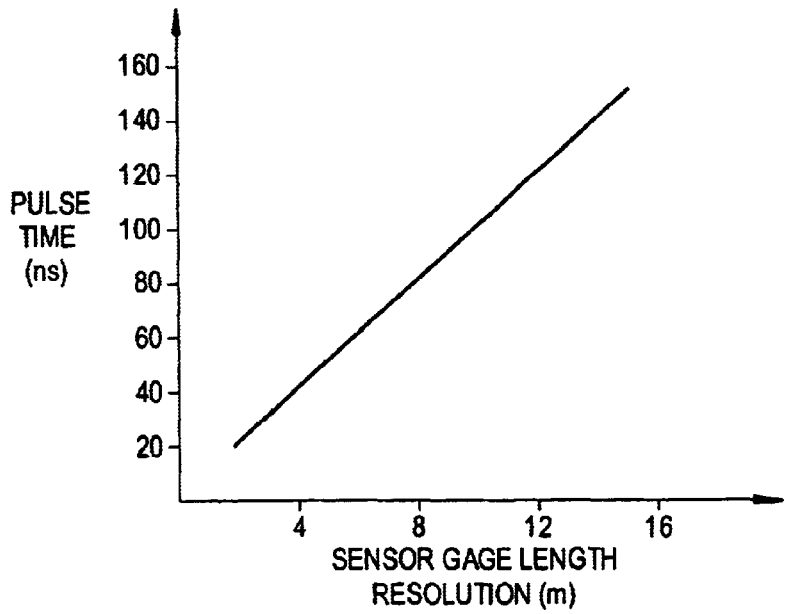
FIG. 4 shows a graph of the effect of laser pulse time (width) on fiber optic sensor gage length (in meters) for Brillouin scattering in a single-mode optical fiber.

(b) Knowing that the velocity of light in the optical fiber is approximately 10 cm/nanosecond, one can calculate the pulse time from FIG. 4 required to obtain a specified "gage length" over which the measurement of strain, displacement or temperature is to be made along the Brillouin sensor 302A. For example, if one used a 40 nanosecond (ns) pulse width, then the light will have travelled 400 cm, which is equal to 4 meters (m). That would then be the effective gage length over which an average strain, displacement or temperature will be measured (see FIG. 4). If the length of the sensor 302A, depicted in FIG. 3 as $L_1$, is greater than 4 m, then one can obtain the distribution of strain, temperature or displacements along the sensor 302A. The pulse signal will be generated at such a time as to interact with the back reflected probe signal, reflected off the mirrored end 304 of the sensor 302A. Note that the pulse signal intensity will undergo the same reductions through the optical couplers as described above for the probe signal.

(c) Using Optical Time Domain Reflectometry (OTDR is a well known technique by those skilled in the art of measuring Brillouin scattering spectra and interpreting the signal response, using a system such as shown in FIG. 1), it is possible to obtain the distance and position discrimination to delineate the optical sensor signals.

(d) Analysis of the Brillouin shift and the Brillouin loss spectrum, for example, will yield the average strain and temperature over the gage length. The average displacement can then be calculated by multiplying the strain by the sensor 302A gage length (where strain is defined as the ratio of displacement/sensor gage length, a well known parameter in structural engineering).

(e) As the pulse light continues to propagate along the fiber backbone 306, it again splits into two components at an optical coupler 230, such that one component is directed to the sensor 302B (with appropriate reductions in light intensity as described above for the probe signal) and the other component continues along the fiber backbone 306 to the next sensor (not shown).

(f) That process continues for the number of sensors in the array, which will be determined by the overall sensitivity of the Brillouin instrument 308, such as the threshold light sensitivity of the detectors and the optical power of the laser light sources, as well as the efficiency of the optical couplers. The optical fiber backbone itself can be used as a Brillouin sensor if it is mirrored as well, or re-directed back to the Brillouin instrument as shown in FIG. 1.

One example offered to demonstrate the application of the MBSA system is shown in FIG. 5, namely, a system 500 applied to a pipeline structure 502. Again using a Brillouin instrument 308, with an optical fiber backbone 306, one splits off a number of Brillouin sensors 302A, 302B, 302C, . . . , of different lengths denoted as $L_1$, $L_2$, and $L_3$, respectively. Each sensor 302A, 302B, 302C, . . . , has a mirrored end. The backbone 306 can be constructed with or without a mirrored end, depending on its required use as a sensor or light conduit only. Following the propagation of probe and pulse lightwaves as described above, the OTDR capability within the Brillouin instrument allows one to measure pipe strains and temperature distributions along each sensor over each section 504 of the pipeline 502, and from section to section. Again, optical couplers 230 are used to direct the light to the various Brillouin sensors 302A, 302B, 302C, . . . . The data can then be used to assess the structural integrity and performance of the pipeline 502, and determining maintenance cycles for replacement, pipe failures, leaks, buckling and other structural response characteristics of importance to structural pipeline engineers.

Interpretation of the fiber optic sensor strain data, as described above, is shown in FIG. 6, where one can use the Brillouin strain data to assess pipe wall thinning associated with internal corrosion and erosion, pipe bending and buckling, pipe leaks and fracture. FIG. 7 shows how one can also interpret the sensor temperature data for both the diurnal and seasonal cycles.

Another embodiment of the single Brillouin fiber optic sensor system as applied to pipelines is depicted in FIG. 8 as 800. The Brillouin instrument 308 is connected to a single optical fiber 802 which is spirally wrapped over the pipe 502, as in FIG. 5. In the embodiment of FIG. 8, strain and temperature distributions are measured along the single optical fiber 802, over gage lengths determined by the pulse width employed by the modulated pulse laser in the Brillouin instrument 308. Again, interpretation of the Brillouin strain and temperature data in terms of pipeline response can be determined from FIGS. 6 and 7. An advantage of using a spiral wrap sensor configuration is that one can readily measure hoop strain, with some axial component of strain (which can be calculated using standard engineering formulae well known to pipeline structural engineers), and configure the sensor such that it can run down the length of the pipeline over great distances, exceeding 50 km for example, when using the Brillouin technique of strain and temperature measurement.

Another aspect of the invention is the use of pulse modulators to create variable pulse widths (ie: variable gage lengths) to do rapid "coarse scans" and detailed "fine scans" for higher resolution strain, displacement and temperature distribution measurements on structures. In FIG. 4, the calculated "gage length" is shown as a function of laser pulse time, assuming a light wave velocity in the single mode optical fiber of 10 cm per nanosecond. That allows the user to employ both "coarse scan" (ie: long pulse time, long gage lengths) and "fine scan" (ie: short pulse time, short gage lengths) measurements while remotely monitoring the structural integrity and load conditions of a given structure. Control of the location of the measurements is achieved by means of optical time domain reflectometry (ie: measuring the propagation times of these light pulses travelling to/and back from the selected "gage length" sector in the fiber). The application of the Brillouin spectrum analysis technique allows the user to not only control where the measurements are made on the structure, but the "gage length" over which the measurements are made. By reducing the gage length, localized strains/temperatures can be measured. On the other hand, by enlarging the gage length, less resolution of the strain/temperature field results, but reduces the time required to interrogate a very large structure.

For example, a pipeline typically includes an assembly of pipe sections of given length (for example, ~24 meter section length). By employing a "gage length" scan which encompasses many pipe sections (a "coarse scan"), one can traverse the pipeline in a shorter time interval. When a particular scan exhibits an unexpected strain level, the interrogating light pulse length can then be reduced (as per FIG. 4) to locate more precisely the strain field of interest within the pipe "coarse scan".

Another embodiment of the present invention applies Brillouin fiber optic strain sensor arrays (or a single optical fiber) for measuring structural displacements due to applied loads or movement of foundations on which the structures rest or are otherwise attached to said foundation. This "Multiple Brillouin Displacement Sensor" array is another application for the Brillouin spectrum analysis technique. Examples where the measurement of displacements are required include, but are not limited to, ground settling of pipelines and buildings, monitoring cracking of dams due to ground settling, movement of structures due to seismic loads or growth of seismic cracks and fissures. The Brillouin sensor system can be configured in such a way that the strains determined from a fiber optic sensor can be converted into displacements which arise from the sensor being bonded or otherwise attached to the structure or foundation upon which the structure rests. The application of Brillouin sensors to create Multiple Brillouin Displacement Sensors (MBDS) using a single optical fiber is described below. MBDS can also be configured as separate sensors, with the sensors individually attached to their own pair of fixed anchors or points of reference.

Figure 9A:
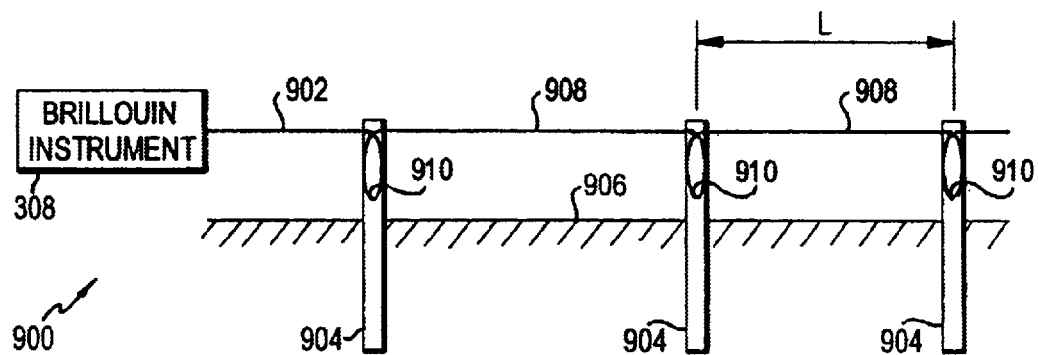
FIG. 9A shows a schematic diagram of a system using a single Brillouin sensor fiber for sensing ground displacements.

Such an embodiment is shown in FIG. 9A as 900. Using Brillouin technology and a single optical fiber 902, sections of the fiber 902 are attached to rigid ground anchors 904 anchored in the ground 906. The distance between the points of the optical fiber 902 attached to the anchors 904 is designated by "L". The sections of fiber 908 between the anchors 904 are unbonded and free to stretch or contract between the fixed end points. The points of the fiber 902 anchored to the anchors 904 are formed as fiber loops 910 (which form a part of the continuous optical fiber 902) and are used to pre-tension the fiber sensor lengths, thus allowing for contraction of the fiber section 908 between the fixed points.

The pulse width in ns is set to 0.1 L. The displacement between anchors 904 is $E_M L$.

The pre-tension must take into account the temperature changes that will be encountered during the operation of the sensor, such that as temperature increases and the fiber expands, no slackening of the fiber occurs due to the pre-tension. Note that the thermal coefficient of expansion for single mode telecom optical fiber, used to construct the Brillouin displacement sensor (the preferred mode, but not to be construed as the only suitable fiber), is very low (typically being in the range of 1 microstrain per degree of temperature change) and thus readily taken into account during pre-tension.

Figure 9B:
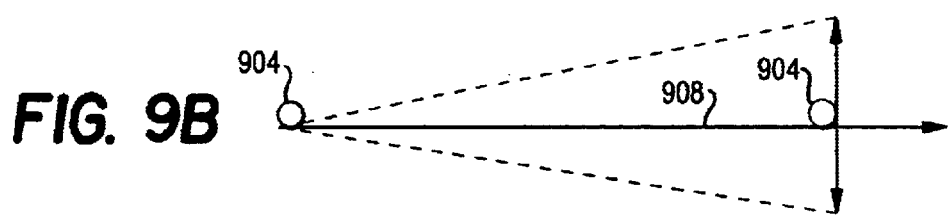
FIGS. 9B–9E show examples of the ground displacements to which the system of FIG. 9A may be exposed.
Figure 9C:
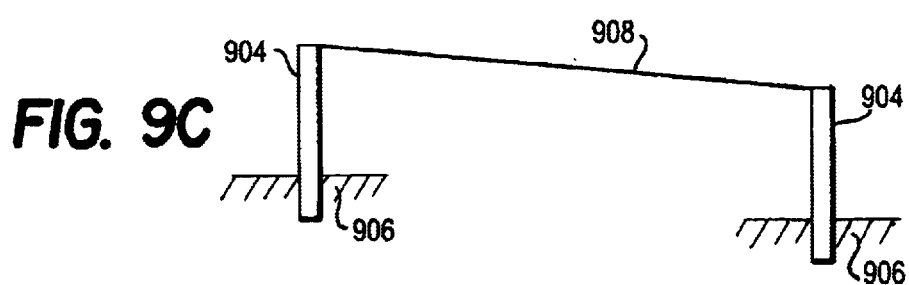

Movement of the ground anchors can lead to sensor tension (extension) as shown in the examples of FIGS. 9B and 9C, which show, respectively, a downward view of sensor extension caused by relative lateral motion of a ground anchor 904 and a side view of sensor extension caused by ground settling. The sensor displacement (D) is determined from the measured Brillouin strain ($E_m$) as, $$D = E_m L \text{ where L is the original sensor length.} \qquad (3)$$

Figure 10:
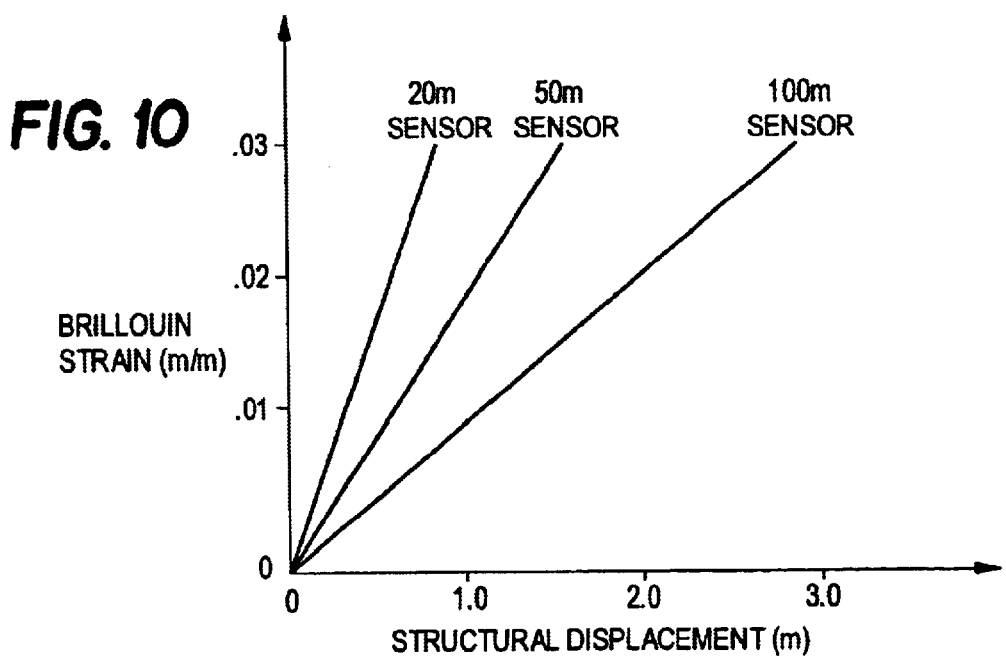
FIG. 10 shows a graph of Brillouin strain as a function of structural displacement for various sensor lengths.

The maximum displacement that the sensor can provide is limited by its tensile strength. Calculations based on typical single mode fiber elongations to failure (about 3%) are shown in FIG. 10. For example, if the BDS length is 20 meters, then the maximum displacement that the fiber could experience prior to tensile failure is about 0.6 meters.

For applications in continuous monitoring of foundations for example, as the foundation moves, due to ground settling or cracks within the foundation, displacements up to fiber failure would be detected, which for the above example, would be up to 0.6 meters. Longer BDS systems can be employed to yield larger displacement limits on the fiber.

Figure 9D:
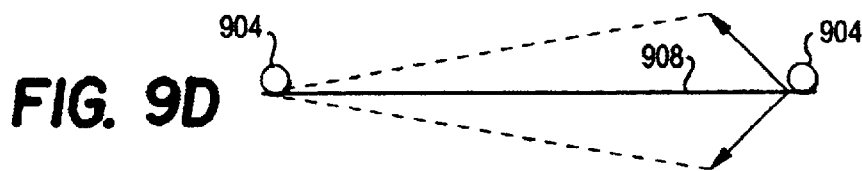
Figure 9E:
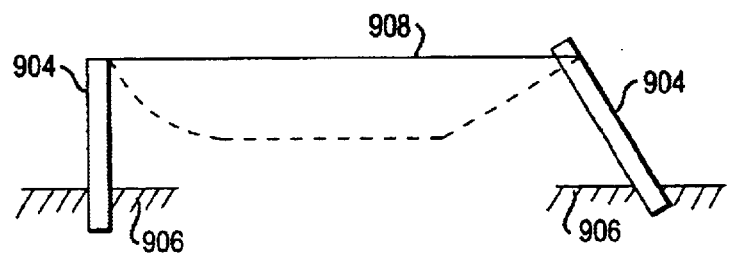

When the movement of the anchors is towards each other, then slackening of the pre-tension strain in the fiber occurs, as illustrated in FIG. 9D, which shows a plan view of sensor movement causing fiber shortening. When the movement exceeds the pre-tension value, as shown in FIG. 9E, then the fiber slackens, and no Brillouin strain is recorded. Once that occurs, then the monitoring system will record a negative value of deflection corresponding to the pre-strain employed in the sensor during installation. Using longer lengths of a sensor allows larger pre-strains to be employed, thus increasing the displacement range measured in the inward movement direction.

A balanced displacement sensor configuration can be employed even if the magnitudes of the inward/outward movement of the anchors is not known. To allow for equal movement values, the pre-tension strain can be set to ½ the maximum fiber elongation, leaving ½ of that maximum elongation value for measuring tensile (outward) movement.

Thus it is possible to use the Brillouin technology to measure and monitor changes in displacements over prescribed gage lengths, which correspond to the BDS sensor lengths "L".

Note that any value of "L" can be used between the fixed anchor points, and these variable gage lengths can be measured using different laser pulse widths, as determined by the curves shown in FIG. 4.

Figure 11:
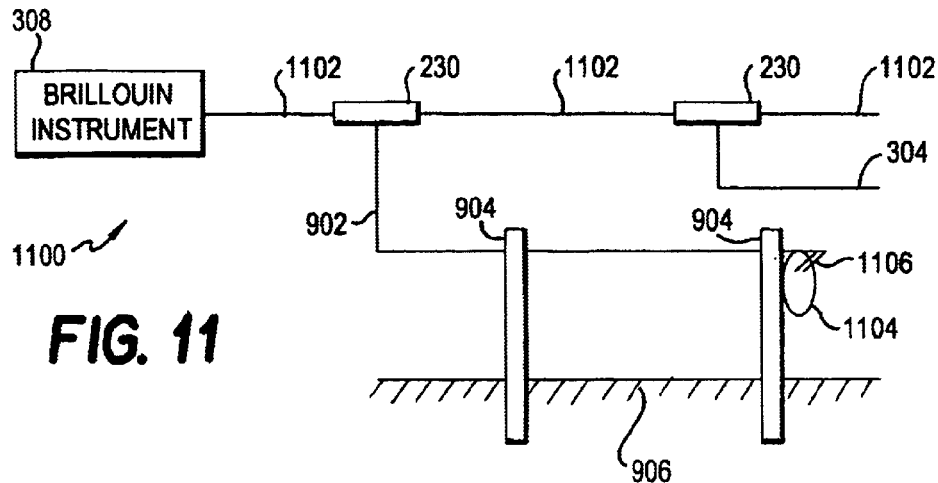
FIG. 11 shows a schematic diagram of a modification of the system of FIG. 9A incorporating multiple Brillouin fiber sensors.

If one requires a redundant BDS system, then a sensor 1100 can be provided, as shown in FIG. 11, using multiple sensors 902 running off a single backbone optical fiber 1100, with each mirrored sensor 902 being attached to its own set of anchor points 904 anchored in the ground 906. The advantage of that configuration is redundancy in that if one or more sensors become inoperative due to failure, the other sensors are still accessible along the common fiber optic backbone. The MBDS system employs a Brillouin instrument 308 to generate the laser lightwaves and provide the detection and spectrum analysis. The optical fibers in that particular configuration have mirrored ends 1106 to provide the counter propagating lightwave, although one can route the optical fiber backbone 1102 back to the Brillouin instrument 308 if required. Optical couplers 230 are employed to split the incident lightwaves into components (in prescribed ratios defined by the coupler characteristics) that travel into the Brillouin displacement sensors (shown as two sensors 902 in the present example, but not limited to only two sensors). The first sensor 902 is attached at each point on a pair of rigid ground anchors 904, which are themselves partially buried in the ground 906, or in a foundation (used in this example only to illustrate a means of fixing an optical sensor). In addition, an unattached fiber loop 1104 forms a part of the Brillouin displacement sensor to permit pretension of the optical fiber sensor, as described above. The wavelength signals in the fiber sensor reflect off a mirrored end 1106, positioned at the end of the loop 1104. Since the loop 1104 is not under mechanical straining, and providing it is of sufficient gage length to allow interrogation by the selected laser pulse width, then measuring the Brillouin strain in that section of the optical fiber permits one to obtain the measurement of the local temperature occurring on the fiber loop 1104. That value can then be used to estimate the temperature strain component in the gage length interrogated within the displacement sensor length (ie: the length between fixed points), thus allowing one to estimate the relative displacement of the fixed points due to straining of the sensor, arising from movement of the foundation or ground holding the base of the anchors. That MBDS array concept can be used to install multiple Brillouin sensors over long distances, using the common optical fiber backbone.

The backbone 1102 can also function as a Brillouin sensor if it also contains a mirrored end. Throughout the present disclosure, the use of the words "mirrored end" is generic and intended to encompass any and all optical elements for reflecting the light waves within the backbone fiber or any and all sensors. The backbone 1102 has value as a Brillouin sensor can arise if, for example, it is not bonded or attached to a structure, and thus provides a means of measuring temperature distributions along its length. In another embodiment, it can be bonded to a structure and also provide total strain measurements using the Brillouin technique.

Figure 12:
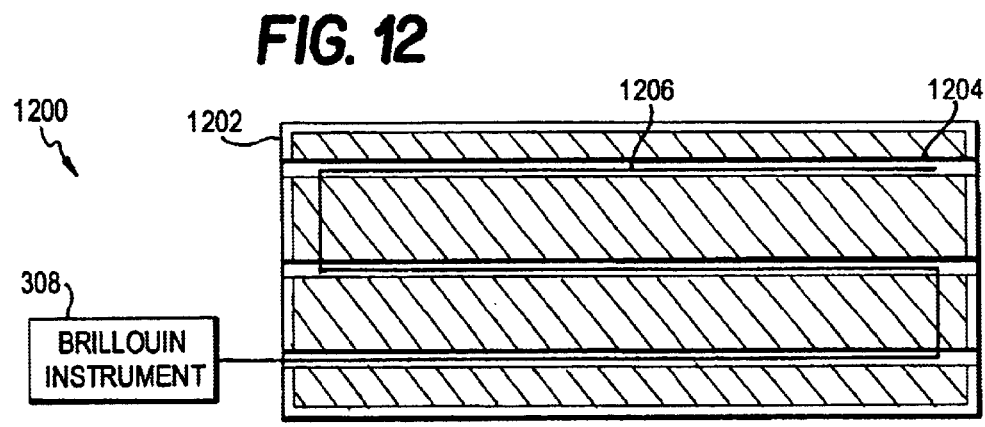
FIGS. 12 and 13 show schematic diagrams of an embodiment of the invention for use on bridges.
Figure 13:
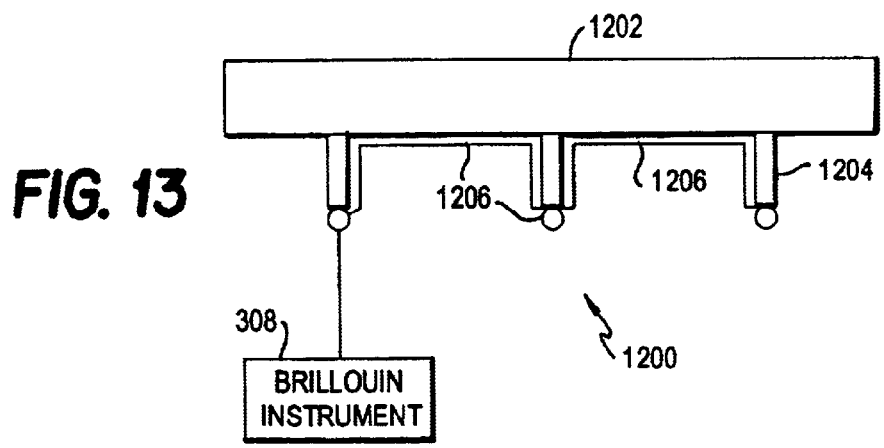

Brillouin sensors can also be applied to bridges along girders to measure deflections and bending strains over the full expanse of the bridge. FIGS. 12 and 13 show schematic diagrams of upward and cross-sectional views, respectively, of one such system 1200 applied to a bridge having a bridge deck 1202 and bridge girders 1204. In addition, by wrapping the sensor around reinforced concrete support columns, corrosion detection is possible by monitoring the hoop strain changes (ie: increase in circumferential strain due to internal swelling of the concrete and separation from the steel reinforcements for example). In its simplest embodiment, the bridge sensor system 1200 includes a Brillouin sensing fiber 1206 leading from the Brillouin instrument 308 to its first attachment point on a girder 1204. The schematic illustrates the routing of the fiber along each girder 1204 and assumes a mirrored end (or any other reflective element to produce the counter propagating wavelengths). The application of multiple Brillouin strain sensors, as previously described, can also constitute another embodiment by splitting Brillouin sensors using optical couplers, off the fiber backbone and attaching said sensors to other parts of the bridge structure, such as support columns, decking and girders.

It is another aspect of the present invention to utilize within the concept of Multiple Brillouin Displacement Sensor arrays a number of unbonded, or unattached sensors, to measure temperature, with no contribution from mechanical straining. Thus, these thermal detection sensors can be used to correct the bonded or attached sensor strains by subtracting the thermal readings to yield the mechanical strain values, as per Eq. (2). Again, using the measurement and analysis techniques of the art, one can also employ the simultaneous measurement of temperature and strain (or displacement) for correcting the measured strain for thermal effects, thus allowing one to determine the strain due to the actual structural loading. That is accomplished by knowing the thermal coefficient of expansion of the substrate material to which the optical fiber is bonded, and knowing the temperature, the corresponding thermal strain can be calculated using a standard well known engineering formula, $$E_t = \alpha(\Delta T) \qquad (4)$$

where $\alpha$=thermal coefficient of expansion of substrate material to which optical fiber is attached/bonded/embedded, and $\Delta T$=temperature change, as measured by the Brillouin technique described above. Thus one can subtract that value from the measured Brillouin strain (Eq.2) to obtain the "mechanical" strain due to loads, corrosion or other non-thermal effects which produce straining of said structure.

While various preferred embodiments have been set forth above, those skilled in the art who have reviewed the present disclosure will readily appreciate that other embodiments can be realized within the scope of the present invention. For example, numerical examples are illustrative rather than limiting, as are recitations of specific types of optical fibers. Also, mirrored ends can be implemented through any suitable reflective elements, such as metal coatings or multilayer interference stacks.

Therefore, the present invention should be construed as limited only by the appended claims.

I claim:

1. A method for measuring strain or displacement on a structure, the method comprising:
   (a) applying an optical fiber to the structure, the optical fiber experiencing a Brillouin effect in response to the strain or displacement;
   (b) introducing a first light into the optical fiber such that the Brillouin effect in the optical fiber affects the first light to produce a second light;
   (c) receiving the second light;
   (d) measuring the Brillouin effect from the second light; and
   (e) measuring the strain or displacement from the Brillouin effect;
   wherein step (b) is performed a first time with a first pulse width to achieve a coarse scan and a second time with a second pulse width to achieve a fine scan.

2. The method of claim 1, wherein step (a) comprises applying a single optical fiber to the structure.

3. The method of claim 2, wherein the single optical fiber has a length of at least 10 cm.

4. The method of claim 3, wherein the single optical fiber has a length of at least 50 km.

5. The method of claim 1, wherein the structure comprises a pipeline.

6. The method of claim 5, wherein step (a) comprises wrapping the optical fiber around the pipeline in a spiral wrap.

7. The method of claim 6, wherein step (a) comprises applying a plurality of the optical fibers around the pipeline at different locations.

8. The method of claim 5, wherein step (e) comprises using the strain or displacement to determine at least one of pipe wall thinning, pipe buckling, pipe bending due to ground settling, and a leak or rupture in the pipeline.

9. The method of claim 1, wherein the structure comprises a bridge or a part of a bridge.

10. The method of claim 9, wherein the part of the bridge is a bridge girder, bridge deck or bridge support column.

11. The method of claim 1, wherein step (a) comprises fixing the optical fiber to the structure at fixed points and leaving the optical fiber free at locations between the fixed points.

12. The method of claim 11, wherein the locations between the fixed points are pre-tensioned to permit measurement of contraction of the optical fiber.

13. The method of claim 12, wherein the locations between the fixed points are pre-tensioned to prevent slackening of the optical fiber from thermal expansion.

14. The method of claim 1, wherein the structure is a foundation.

15. The method of claim 1, wherein the optical fiber comprises:
   a backbone optical fiber; and
   a plurality of optical fiber sensors in communication with the backbone optical fiber.

16. The method of claim 15, wherein the optical fiber further comprises at least one section of optical fiber which is not exposed to the strain or displacement, and wherein step (e) comprises measuring a temperature from the at least one section of optical fiber which is not exposed to the strain or displacement and using the temperature to compensate a measurement of the strain or displacement.

17. The method of claim 16, wherein the optical fiber is formed as a single optical fiber, and wherein the plurality of optical fiber sensors and the at least one section of optical fiber which is not exposed to the strain or displacement are formed in separate sections of the single optical fiber.

18. The method of claim 15, wherein the plurality of optical fiber sensors branch off from the backbone optical fiber.

19. The method of claim 1, wherein step (e) comprises monitoring development and growth of cracks and fissures in the structure.

20. The method of claim 19, wherein the structure comprises a dam.

21. The method of claim 19, wherein the structure comprises a foundation.

22. A method for measuring a physical condition in a region, the method comprising:
   (a) providing an optical fiber in the region, the optical fiber experiencing a Brillouin effect in response to the physical condition;
   (b) achieving a coarse scan by introducing a first light having a first pulse width into the optical fiber such that the Brillouin effect in the optical fiber affects the first light to produce a second light;
   (c) achieving a fine by scan introducing a third light having a second pulse width into the optical fiber such that the Brillouin effect in the optical fiber affects the third light to produce a fourth light;
   (d) receiving the second light and the fourth light;
   (e) measuring the Brillouin effect from the second light and the fourth light; and
   (f) measuring the physical condition from the Brillouin effect.

23. A sensor system for measuring a physical condition in a region, the sensor system comprising:
   an optical fiber which experiences a Brillouin effect in response to the physical condition; and
   a Brillouin sensor instrument, in optical communication with the optical fiber, for achieving a coarse scan by introducing a first light having a first pulse width into the optical fiber such that the Brillouin effect in the optical fiber affects the first light to produce a second light, achieving a fine scan by introducing a third light having a second pulse width into the optical fiber such that the Brillouin effect in the optical fiber affects the third light to produce a fourth light, receiving the second light and the fourth light, measuring the Brillouin effect from the second light and the fourth light and measuring the physical condition from the Brillouin effect.

* * * * *